Nov. 11, 1924.
W. C. ANTHONY
ELEVATING SHOVEL
Filed Nov. 13, 1922    2 Sheets-Sheet 2
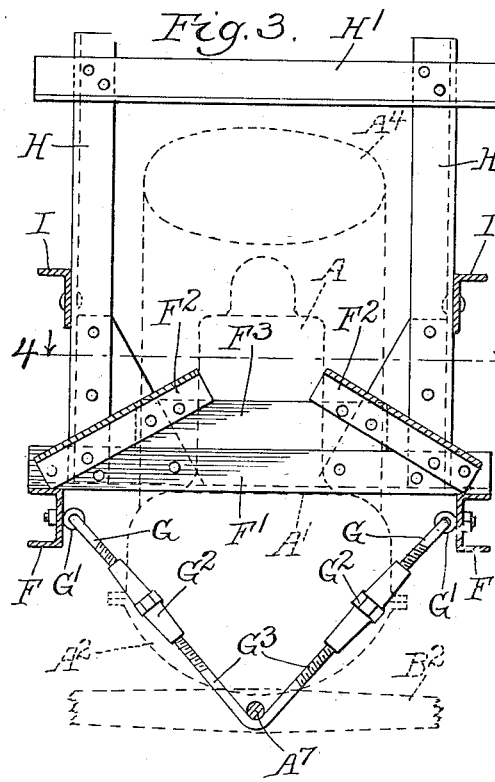
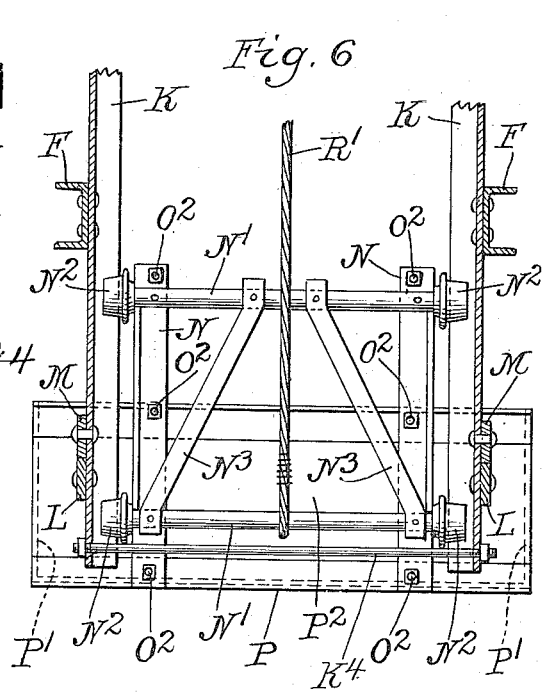
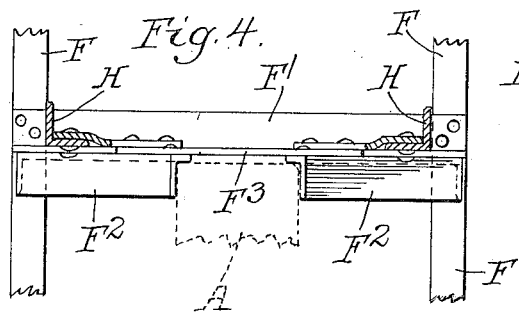
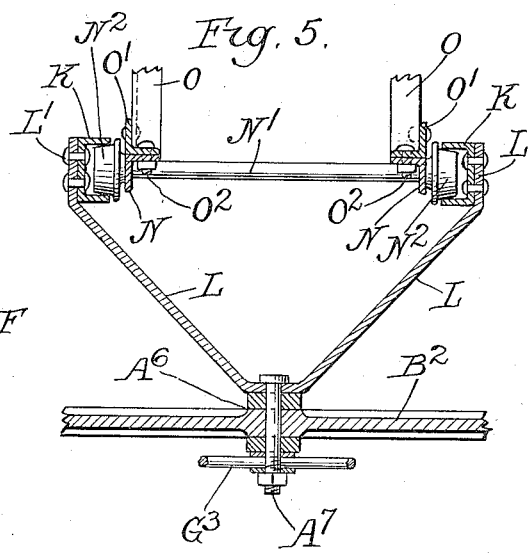
Witness.
Edward T. Wray.
Inventor.
William C. Anthony
by Parker & Carter.
Attorneys Patented Nov. 11, 1924.

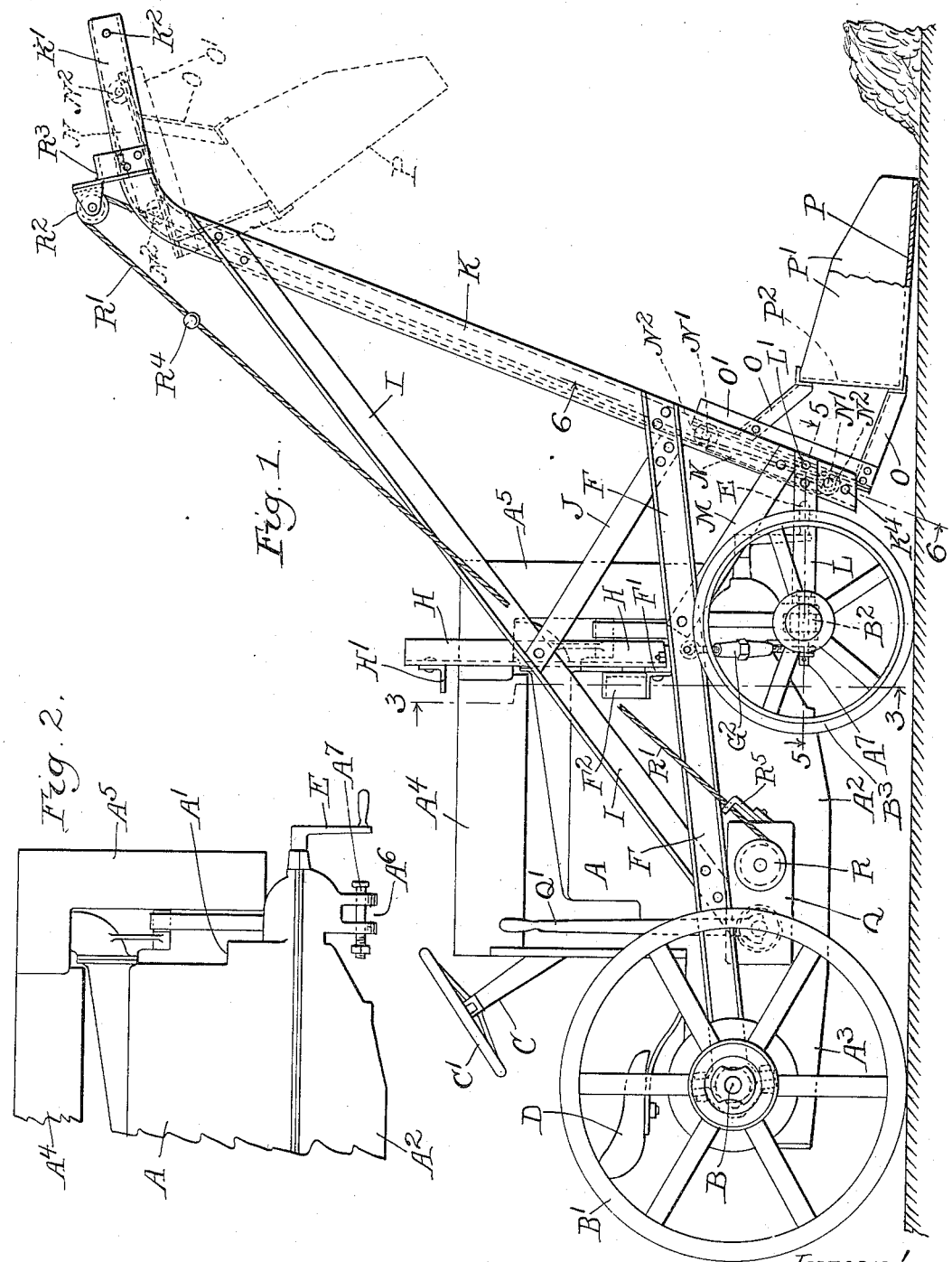

1,514,817

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

ELEVATING SHOVEL.

Application filed November 13, 1922. Serial No. 600,571.

*To all whom it may concern:*

Be it known that I, WILLIAM C. ANTHONY, a citizen of the United States, residing at Streator, in the county of La Salle and State of Illinois, have invented a certain new and useful Improvement in Elevating Shovels, of which the following is a specification.

This invention relates to a hoisting shovel adapted to be mounted on a tractor and to be used primarily in raising material from the level on which the tractor operates. It can, of course, be used for raising any material from any level. It has for one object to produce a compact apparatus adapted for use in road building, and particularly adapted to raise road building material which has been dumped on the surface of the road and put it into a concrete mixer or put it into cars or other vehicles. Another object is to provide such a lifting shovel which can be used for any purpose where it is necessary to scoop up and raise material from one level to another. Other objects will appear from time to time throughout the specification and claims.

My invention is illustrated more or less diagrammatically in the accompanying drawings, wherein:

Figure 1 is a side elevation of the shovel;

Figure 2 is a fragmentary side elevation showing a portion of the engine radiator of the tractor;

Figure 3 is a vertical cross section taken on line 3—3 of Figure 1 on a somewhat enlarged scale;

Figure 4 is a horizontal cross section taken on line 4—4 of Figure 3;

Figure 5 is a fragmentary horizontal cross section taken on line 5—5 of Figure 1;

Figure 6 is a fragmentary vertical cross section taken on line 6—6 of Figure 1.

Like parts are designated by like characters throughout.

A is an engine provided adjacent its forward end with a projection $A^1$, and provided on its under side with a crank case $A^2$. This crank case is permanently joined to a transmission casing $A^3$. $A^4$ is a fuel tank above the engine. $A^5$ is a radiator and radiator housing.

B is an axle projecting from the rear of the transmission housing $A^3$, and upon either end of the axle is mounted a driving wheel $B^1$. $B^2$ is a forward axle mounted in a slot $A^6$ in the forward end of the engine housing and held in position by a pin $A^7$. $B^3$ is one of the forward wheels of the vehicle.

C is a steering column upon which is mounted a steering wheel $C^1$. D is a seat. E is a crank by means of which the engine is started.

To support the structure of the lifting shovel there is provided about the vehicle assembly a three-sided frame consisting of two main longitudinal members F, F which are mounted upon the rear axle housing and are inclined upwardly toward their forward end. At a point approximately over the forward axle the side members are joined together by means of a substantially horizontal cross member $F^1$. This member rests upon the projection $A^1$ of the engine casting. Fastened to either end of the members F and converging upwardly are a pair of bracing members $F^2$, $F^2$. These members are preferably formed of angles and are welded or riveted to the cross member $F^1$ and abut against the cylinder casting. They are further held together by a strap member $F^3$. By means of this assembly the forward end of the supporting frame is carried on the engine casting and is steadied in position. As a means of further steadying the frame, bracing members beneath the engine are provided. These comprise a pair of stays G, G which are fastened at one end in eyes $G^1$, $G^1$ in the side members F, F, and are joined together by means of turnbuckles $G^2$, $G^2$ to the lower steadying member $G^3$ which extends about the pin $A^7$.

Extending vertically upward from the side members F, F at approximately the point where the cross member $F^1$ is applied, are a pair of vertical posts H, H. These members are joined at their top by a cross member $H^1$.

Fastened to each of the side members F, F and inclined forwardly and upwardly and also fastened to the vertical members H, H are a pair of track supporting members I, I. Joined to the side members H and the members I are a pair of downwardly and forwardly extending truss members J, J. These members are joined at their forward ends to the side members F adjacent their forward ends.

Fastened to the forward end of the side members F and the members I are a pair of channeled track members K, K. These members extend generally, forwardly and upwardly and are laterally bent at their upward and forward ends as at K¹, K¹, and are provided at their ends with stops K², K² to prevent the bucket from running off. The members K are supported at their lower ends by means of the generally triangular brace L, which is supported on the front axle B² and held in position by means of the pin A⁷. The outer ends of this brace are fastened to the track members K, K as at L¹, L¹. To further support and steady the lower end of the track members, a pair of downwardly inclined supporting braces M, M is provided. These braces are joined to the side members F at a point approximately over the forward axle B², and at their lower ends are fastened to the track members K, K. K⁴ is a bottom stop in the tracks K to prevent the bucket from being lowered so as to fall out of the tracks.

N, N are a pair of frame members in which are fixed two axles N¹, N¹, each of which carries at its end a roller N², N². Bracing members N³, N³ are provided to keep the frame rigid. Extending forwardly and downwardly from the frame are a plurality of bucket holding members O, joined by side braces O¹ O¹. On the forward ends of these members is mounted the bucket P which is generally rectangular in plan and provided with the side walls P¹, and the rear wall P², and open at its forward end.

Mounted on the side of the tractor is a combined reducing gear and clutch arrangement Q which is adapted to take its power from the engine and to be controlled by a lever Q¹.

R is a drum extending from the side of the reducing gear assembly. The drum R engages and at the will of the operator drawn in or pays out a cable R¹ which passes over a roller R² which is mounted adjacent the top of the track members K, on a bracket R³. The cable is fastened to the bucket frame adjacent its bottom. Fastened on the cable is a stop member R⁴. When the cable is pulled so that the bucket reaches its upper limit, this member R⁴ contacts the stop lever R⁵ which automatically throws the hoisting gear out of operation and prevents further hoisting of the bucket.

Although I have shown an operative device, still it will be obvious that many changes in size, shape, and arrangement of parts might be made without departing from the spirit of my invention, and I wish therefore that my showing be taken as in a sense diagrammatic.

The use and operation of my invention are as follows:

When it is desired to raise the material from the road surface, the bucket is lowered to the position shown in Figure 1. The entire vehicle is then driven forward until the bucket is full. It is then preferably stopped and the bucket is raised. If the material is not to be dumped at once, the bucket is raised only enough to clear the pile of material against which it has been working. The vehicle is then driven to the point of discharge and the bucket is further raised until it comes upon the forwardly curved portion of the track. As it moves out on that portion of the track, it is tipped and the material is dumped.

If the material is to be dumped, as is sometimes the case, at the point where it is picked up, as for example in filling a concrete mixer, the vehicle is moved into the pile until the bucket is filled. It is then stopped and the material in the bucket is raised in one movement from its lowest to its highest position, and the material is simply raised and dumped.

It will be obvious that many uses can be made of this arrangement, and its use described herewith is merely illustrative of one of such uses.

For certain purposes the bucket may be entirely removed and the cable mechanism may then be used as a derrick. In that case any suitable attaching means is fastened on the lower end of the cable and the load may be hoisted and carried in any desired manner. A bucket of another type might also be used, and therefore I do not wish to be limited to the use of a bucket of the type shown.

I claim:

1. In combination with a tractor, a rigid supporting frame including side members, said members supported at one end upon the rear axle of said tractor, a supporting bridge resting upon the engine of said tractor and supporting and joining said side members intermediate their ends.

2. In combination with a tractor, a rigid supporting frame including side members, said members supported at one end upon the rear axle of said tractor, a supporting bridge resting upon the engine of said tractor and supporting and joining said side members intermediate their ends, track members carried by said supporting frame, and a bucket adapted to move along said track members.

3. In combination with a tractor, a rigid supporting frame including side members, said members supported at one end upon the rear axle of said tractor, a supporting bridge resting upon the engine of said tractor and supporting and joining said side members intermediate their ends, track members carried by said supporting frame, and a bucket adapted to move along said track members, vertical members extending upward from said side members adjacent the point of attachment of said supporting bridge, and bracing members forming in combination with said vertical members and said side members a truss adapted to stiffen said frame.

4. In combination with a tractor, a rigid supporting frame including side members, said members supported at one end upon the rear axle of said tractor, a supporting bridge resting upon the engine of said tractor and supporting and joining said side members intermediate their ends, track members carried by said supporting frame, and a bucket adapted to move along said track members, and bracing members extending upward and downward from said side members and attached to said track members.

5. In combination with a tractor, a rigid supporting frame including side members, said members supported at one end upon the rear axle of said tractor, a supporting bridge resting upon the engine of said tractor and supporting and joining said side members intermediate their ends, track members carried by said supporting frame, and a bucket adapted to move along said track members, vertical members extending upward from said side members adjacent the point of attachment of said supporting bridge, and bracing members forming in combination with said vertical members and said side members a truss adapted to stiffen said frame, and bracing members extending upward and downward from said side members and attached to said track members.

6. In combination with an automotive vehicle, a rigid track element rigidly mounted on the vehicle, a bucket movable along said track element, a connection between the driving means of the vehicle and said bucket whereby said bucket is raised, the said track being shaped to move the bucket bodily forward as it is raised from its lower position and shaped adjacent the upper limit of its excursion to dump the bucket.

7. In combination with a tractor having a driving engine thereon, a supporting frame mounted upon said tractor and resting upon said engine.

8. In combination with a tractor having a driving engine thereon, a supporting frame mounted upon said tractor and resting at one end upon said engine.

9. In combination with a tractor having a driving engine thereon, a supporting frame mounted upon said tractor and resting at one end upon said engine, said supporting frame carrying a track.

10. In combination with a tractor having a driving engine thereon, a supporting frame mounted upon said tractor and resting upon said engine, said supporting frame carrying a track.

11. In combination with a tractor having an engine thereon, a supporting frame including a pair of generally triangular truss members, said truss members joined by a supporting member which rests upon the engine.

12. In combination with a tractor having an engine thereon, a supporting frame including a pair of generally triangular truss members, said truss members joined by a co-operating truss member which rests upon the engine.

13. In combination with a tractor having an engine thereon, a supporting frame including a pair of generally triangular truss members, said truss members joined adjacent their centers by a co-operating built-up truss member which rests upon said engine.

14. In combination with a tractor having an engine, a supporting frame including side members and a member joining them and resting upon said engine and carrying the weight of said frame, said member adapted to contact the engine at a plurality of points and thereby to be braced against displacement with respect to said engine.

15. In combination with a tractor having a driving engine thereon, a supporting frame mounted upon said tractor and resting upon said engine, whereby said frame is supported from said tractor at three points.

16. In combination with a tractor having a driving engine thereon, a supporting frame mounted upon said tractor and resting upon said engine, whereby said frame is supported from said tractor at three points, two of said points being upon the tractor and one upon the engine.

Signed at Streator, county of La Salle and State of Illinois, this 9th day of November, 1922.

WM. C. ANTHONY.